D. RYERSON.
AXLE.
APPLICATION FILED DEC. 7, 1912.

1,078,698.

Patented Nov. 18, 1913.

Attest:

Inventor:
Daniel Ryerson
by Rogers, Kennedy & Campbell
Attys

UNITED STATES PATENT OFFICE.

DANIEL RYERSON, OF MOLINE, ILLINOIS, ASSIGNOR TO VELIE CARRIAGE COMPANY, A CORPORATION OF ILLINOIS.

AXLE.

1,078,698.  Specification of Letters Patent.  Patented Nov. 18, 1913.

Application filed December 7, 1912.  Serial No. 735,386.

*To all whom it may concern:*

Be it known that I, DANIEL RYERSON, a citizen of the United States, residing at Moline, in the county of Rock Island and State of Illinois, have invented certain new and useful Improvements in Axles, of which the following is a specification, reference being had therein to the accompanying drawing.

This invention relates to axles and axle boxes, and has for its object the provision of a simple means for effectually closing the space between the axle and surrounding box against the entrance of dust and the escape of oil, and this without interfering with the free relative rotation of the parts or the convenient removal of the box from the axle or its application thereto.

With this object in view, my invention consists in an axle member provided with a circumferential groove in which is seated a yielding packing ring, preferably in the form of a split metal ring, the outer surface of which projects slightly beyond the adjacent surfaces of the axle member, so as to fit closely and snugly in the bore of the surrounding axle box and thereby effectually close the intervening space dust-tight and oil-tight.

Figure 1:
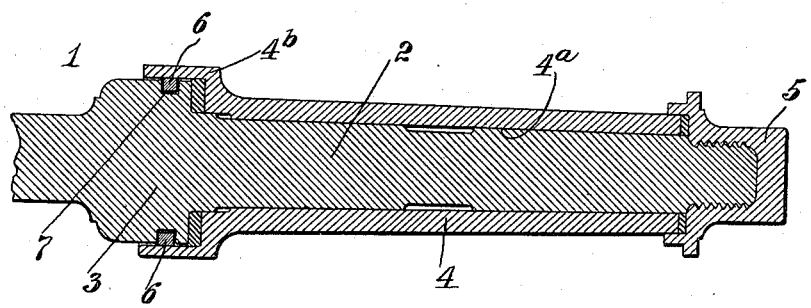
Figure 2:
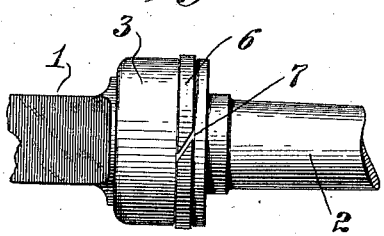
Figure 3:
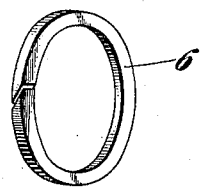
Figure 4:
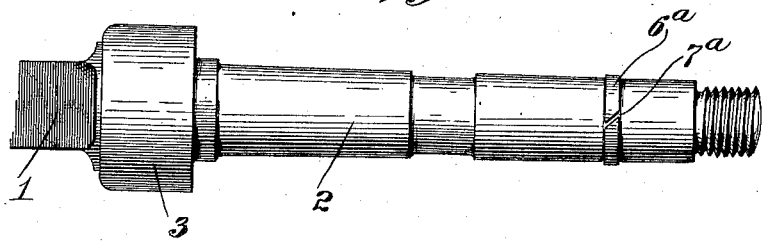

In the accompanying drawings, Figure 1 is a longitudinal section through an axle and axle box, having my invention applied thereto. Fig. 2 is a side elevation of the inner end of the axle showing the packing ring applied thereto. Fig. 3 is a perspective view of the packing ring removed. Fig. 4 is a longitudinal sectional elevation of a modified form of the invention.

Referring to Figs. 1, 2 and 3, which illustrate the preferred embodiment of my invention, 1 represents an axle member consisting of the spindle or axle proper 2, having as usual at its inner end an enlarged portion or bell-collar 3.

4 represents an axle box adapted to be set as usual within the hub (not shown), and having a bearing portion $4^a$ to fit over the spindle 2, and an enlarged sleeve portion $4^b$ to surround the bell collar, the box being held in place on the axle by any appropriate means, in the present instance by means of the usual nut 5, screwed on the outer end of the spindle and provided with a rim flange to bear against and receive the thrusts of the axle box.

In applying my invention in its preferred form, a yielding packing ring 6 is seated loosely in a circumferential groove 7 in the bell-collar 3, the outer surface of the ring projecting slightly beyond the adjacent surfaces of the bell-collar so that when the axle box is applied to the axle, the packing ring will fit snugly and closely within the bore of the enlarged end of the box and thereby effectually seal the intervening space. The ring is preferably formed of metal and is split so as to enable it to be seated within the groove, and to give it the property of yielding when the axle box is applied, and then expanding tightly within the same. The bore of the enlarged end of the axle box, where it fits over the packing ring, is cylindrical and unobstructed, so that the box may be freely passed over the ring when the box is applied to the axle, or may be freely removed therefrom when the box is taken off, it being but necessary when the box is to be removed, to unscrew the confining nut 5, whereupon the box may be slipped off the axle in the customary manner.

With the packing ring constructed and mounted as shown, the outer surface of the same will bear evenly and uniformly within the bore of the box, and will thereby tightly seal the intervening space at this point, the result being that the entrance of dust between the bearing parts will be effectually prevented, as well as the escape of lubricating oil. At the same time there will be no interference with the free rotation of the parts one within the other, either the ring being carried around with the box in the rotation of the latter, or the box sliding around on the ring, according to the fit of the parts. Furthermore, it will be seen that by reason of the fact that the bore of the axle box, where it surrounds the ring, is smooth and unobstructed, the box may be readily removed from the axle or applied thereto in the usual manner, the sole function of the ring being to seal the space between the box and axle member tightly against the entrance of foreign substances, such as dust or dirt, or the escape of oil from between the bearing surfaces.

As shown in Fig. 4, the packing ring may be applied to the axle spindle near its outer end, instead of to the enlarged inner end or bell-collar. In this case the construction of the parts will be the same as that described, the outer end of the spindle being formed with a circumferential groove 7ª to receive a split ring 6ª, the outer surface of the ring projecting slightly beyond the adjacent surfaces of the spindle, so as to bear snugly and uniformly against the internal surface of the axle box near its outer end.

The construction described is of extreme simplicity and durability, and its action is very effective in sealing the space between the axle member and the surrounding box, with the result of both excluding the dust and preventing the escape of oil.

In the accompanying drawings I have illustrated my invention in the particular form and details which I prefer to adopt, but it will be manifest that the details may be changed or modified within the skill of the mechanic without departing from the limits of the invention; and it will be further understood that the invention is not limited to any particular form or construction of the parts except in so far as such limitations are specified in the claim.

Having thus described my invention, what I claim is:

In combination with an axle member provided with a circumferential groove, a yieldingly-formed metallic packing-ring seated in the groove and projecting beyond the adjacent surfaces of the axle member and normally out of frictional contact with that surface of the groove which is parallel with the axis of the axle member, and an axle box surrounding the axle member, said ring having a normal peripheral diameter greater than that of the surrounding surface of the box whereby the latter has its interior closely fitting the projecting portion of the packing-ring.

In testimony whereof I affix my signature in presence of two witnesses.

DANIEL RYERSON.

Witnesses:
O. E. MAUSUR,
E. J. WHITE.

Copies of this patent may be obtained for five cents each, by addressing the "Commissioner of Patents, Washington, D. C."